July 19, 1960
A. S. MURRAY ET AL
2,945,730
SEAL FOR A SEPARABLE BEARING THAT LOCKS
THE BEARING PARTS INTO A UNIT
Filed Aug. 24, 1956
FIG. 1.
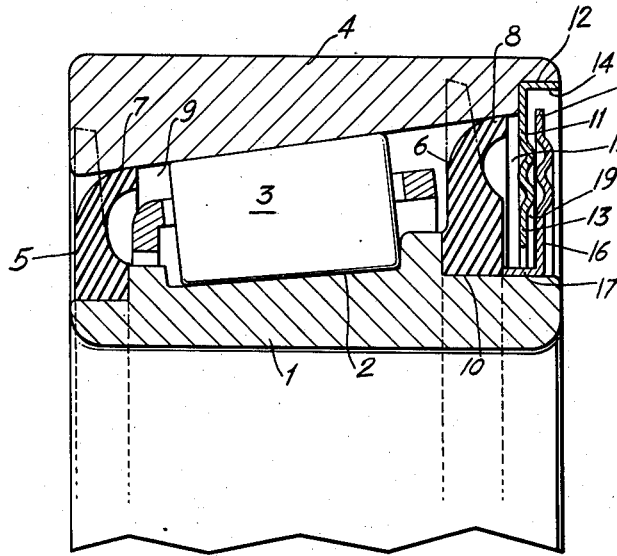
FIG. 2.
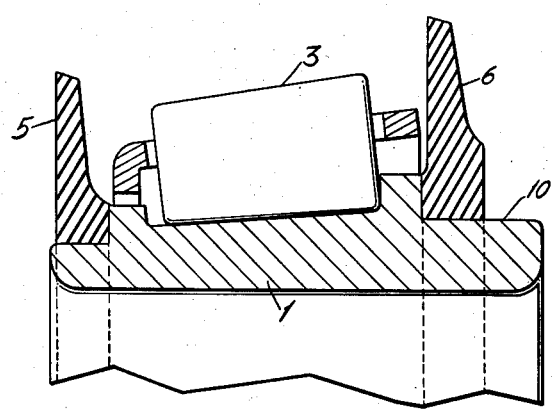
FIG. 5.
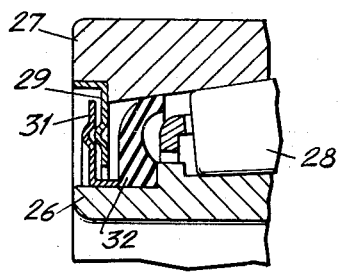
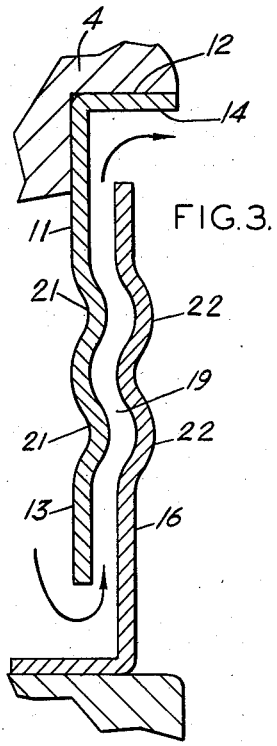
FIG. 3.
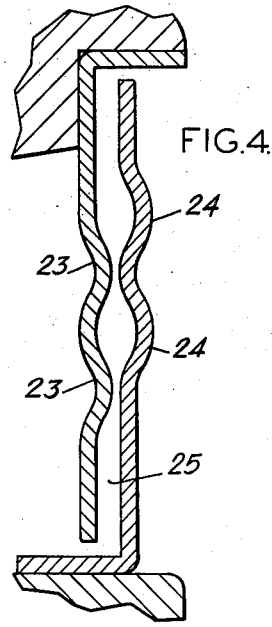
FIG. 4.
INVENTOR:
ALFRED S. MURRAY
JOSEPH L. BRUSCA
BY Howson & Howson
ATTYS.

United States Patent Office 2,945,730
Patented July 19, 1960

2,945,730

SEAL FOR A SEPARABLE BEARING THAT LOCKS THE BEARING PARTS INTO A UNIT

Alfred S. Murray, Haverford, and Joseph L. Brusca, Cheltenham, Pa., assignors to Tyson Bearing Corporation, Massillon, Ohio, a corporation of Delaware Filed Aug. 24, 1956, Ser. No. 606,005

14 Claims. (Cl. 308—187.2)

This invention relates to a seal for anti-friction bearings, said seal functioning primarily to hold lubricant within the bearing and to exclude injurious materials.

One object of the invention is to provide a bearing seal having high efficiency in the primary or sealing function and which at the same time will provide for release of lubricant from the bearing under abnormal internal pressure conditions.

Another object of the invention is to provide a seal of the aforesaid character including means for impounding lubricant released from the bearing as described.

Still another object of the invention, in its relation more particularly to bearings of the type comprising outer and inner axially separable bearing rings, is to provide a seal of the character described which will function also to oppose axial separation of said rings and to form thereby a unitary assembly of the elements of the bearing capable of being handled as such without danger of inadvertent separation of the rings.

The invention resides also in certain structural details of functional significance hereinafter described and illustrated in the attached drawings wherein:

Fig. 1 is a fragmentary axial sectional view of a tapered roller bearing having sealing means made in accordance with the invention;

Fig. 2 is a like view of the bearing with the outer bearing ring removed and illustrating the normal form of the seal elements;

Fig. 3 is an enlarged fragmentary axial sectional view showing details of the labyrinth elements constituting elements of the seal;

Fig. 4 is a view similar to Fig. 3 and illustrating a modification within the scope of the invention; and Fig. 5 is a fragmentary axial sectional view on reduced scale of a tapered roller bearing showing a modification within the scope of the invention.

The drawings show the invention in its application to a tapered roller bearing. This bearing comprises the usual inner ring or cone 1 having a race 2 for the tapered rollers 3 to which race the rollers are axially confined. The bearing comprises also an outer bearing ring or cup 4 which embraces the row of rollers 3 as illustrated in Fig. 1 and provides the outer race for the rollers. It will be apparent that the cub 4 may be withdrawn axially from the cone 1 and rollers 3 by movement to the left as viewed in the drawings.

The seal with which the present invention is concerned consists of two resilient annular elements, 5 and 6 respectively, mounted in the present instance on the inner ring or cone 1 at opposite sides respectively of the row of rollers 3. The normal shapes of the resilient elements 5 and 6 are illustrated in Fig. 2, and also, in broken lines in Fig. 1. As shown, the radial extent of the elements 5 and 6 is greater than the space between the cone 1 and cup 4 so that in order to occupy the said space it is necessary that the outer attenuated peripheral edge portions or lips 7 and 8 of the elements be deflected axially to thereby reduce the effective radial extent of the elements as shown in Fig. 1. This deflection of the lip portions of the elements will take place automatically if, after the elements are mounted in the countersunk end portions 9 and 10 respectively of the cone 1, the cup 4 is moved axially into position over the cone from the left. The elements 5 and 6 will then be forced to assume the distorted positions in which they are shown in Fig. 1 wherein the said lip portions of both are deflected toward the larger end of the cup and are in resilient contact with the inner surface of the cup.

When so assembled, the element 5 deflected inwardly of the bearing space 9 between the cone and the cup and having rubbing sealing contact with the cup race surface will act to retain lubricant in the said space 9; while the element 6, deflected in the same direction and similarly frictionally contacting the cup race surface at the large ends of the rollers will permit discharge of limited amounts of the lubricant from the space 9 under pressure conditions arising from churning of the lubricant by the rollers or rise of temperature within the bearing. Both elements, however, will effectively exclude ingress to the space 9 of dust and foreign materials from external source.

At the outer side of the seal element 6, with respect to the bearing space 9, an annular shield 11 of sheet material, preferably metal, is mounted in a countersunk recess 12 at the end of the cup 4. The flat body portion 13 of this shield normally occupies a substantially radial plane and has at its outer peripheral edge, an axially extending flange 14 which seats in the recess 12 as illustrated. The shield is press fitted to the recess 12 and is frictionally maintained within the latter. The relative position of the shield 11 with respect to the seal element 6 is shown in Fig. 1 and it will be noted that the shield forms with the outer surface of the element 6 a labyrinth space 15 which will receive and impound lubricant escaping from the space 9 past the deflected lip 8 of the element 6. It will be apparent also that when the elements of the bearing and seal are assembled as described above by first inserting the cone with the rollers 3 and the seal elements 5 and 6 within the cup 4, and thereafter inserting the shield 11 in the countersunk recess 12, the shield will then function in conjunction with the element 6 to limit the relative axial movement of the cup 4 with respect to the cone 1 and will in effect produce a unit assembly which may be handled freely as such and without danger of separation of the rings 1 and 4.

As illustrated in Fig. 1, we prefer to use in conjunction with the shield 11 a second correspondingly formed shield 16 having in this instance an axially extended flange 17 at its inner periphery adapted for a press fit in the countersunk recess 10 at the end of the cone 1 which recess also provides a seat for the seal element 6. The radially extended body portion 18 of this shield lies in axially spaced relation and outwardly of the radially extended body portion 13 of the shield 11 and forms with the latter labyrinth passage 19 which communicates at its radially inner end with the adjoining labyrinth passage 15.

We prefer to provide these shields with annular corrugations in their body portions, and the corrugations 21, 21 of the shield 11 may be arranged in axial alignment with the corresponding recesses 22, 22 of the shield 16 as shown in Fig. 3. When so relatively arranged, the corrugations have no effect upon axial dimensions of the labyrinth space 19 which remains constant throughout. When, however, as illustrated in Fig. 4 the corrugations of the two shields designated respectively 23, 23 and 24, 24 are relatively arranged so that they tend by mutual effect to restrict or obstruct the labyrinth passage 25, the corrugations will exert a substantial choking effect upon the passage of lubricant through the space.

The shields 11 and 16, in addition to their function of impounding lubricant passing from the space 9 past the seal element 6 as described, function also to protect the seal element 6 at the large end of the tapered rollers. Also, the corrugations, in addition to affording a medium for regulating the effective width of the labyrinth passage, function to afford a certain radial resiliency in body portions of the shields which tends to resist warp or distortion of the shields when they are pressed onto the bearing rings and to maintain them in their true radial positions.

The labyrinth seal may be applied also to the opposite end, or to both ends of the bearing, as indicated in Fig. 5. In this case the inner and outer race rings 26 and 27 have been extended axially at the smaller ends of the tapered rollers 28 to an extent affording space for reception of annular shields 29 and 31 corresponding to the elements 11 and 16 previously described and functioning in like manner to afford a labyrinth seal at that end of the bearing. In this case, the seal tends to exclude foreign matter from the area at the outer side of, and to protect the element 32; and may serve also to impound solid lubricant in said area as a medium for more positive exclusion of said foreign matter.

The invention, while having an application to tapered roller bearings as illustrated, will find application also to other types of bearings wherein it may be desired to provide seals affording a certain freedom for escape of lubricant from the bearing space under extreme operating conditions; and also in cylindrical roller bearings and ball bearings constructed so that the bearing rings are axially separable, and wherein it may be desirable to produce in effect a unitary package facilitating handling and precluding inadvertent separation of the bearing rings during handling.

We claim:

1. In an anti-friction bearing comprising co-axial radially spaced inner and outer rings and rolling elements in the annular space between said rings, a pair of resilient annular radially extended seal elements mounted one at each end of one of the said rings and having its relatively remote peripheral edge portion in frictional engagement with the confronting peripheral surface of the other ring to seal the said annular space on opposite sides of the rolling elements, the normal radial extent of the annular elements being greater than that of the said space and the frictionally engaged edge portions thereof being deflected laterally by said engagement both in the same axial direction whereby one of said seal elements acts to prevent escape of lubricant from said space while the said lubricant is permitted to escape from said space past the deflected lip of the other element.

2. A bearing according to claim 1 including means at the outer side of the last named element on at least one of said rings for impounding the lubricant so escaping from said space.

3. A bearing according to claim 2 wherein the said impounding means comprises an element on the frictionally engaged ring extending radially in overlapping relation with the adjacent seal element.

4. A bearing according to claim 1 including means on the said other ring coactive with one at least of the seal elements to resist axial separation of said rings.

5. A bearing according to claim 4 wherein the separation resisting means consists of a radially extended element forming with that one of the seal elements past which the lubricant is permitted to escape a labyrinth passage in which the escaped lubricant is impounded.

6. A bearing according to claim 1 including labyrinth means carried by one at least of the rings at the outer side of the seal element last named for impounding the lubricant escaping from the said bearing space.

7. A bearing according to claim 6 wherein the labyrinth means includes two radially extended axially spaced elements mounted respectively on said rings and of which the one immediately adjoining the seal element is mounted on the ring with which the said edge portion of the said seal element is frictionally engaged.

8. An anti-friction bearing comprising coaxial radially spaced and axially separable inner and outer rings and rolling elements in the annular space between said rings, seal means for said space including an element of soft rubber-like resiliency mounted on one of said rings and extending radially and freely into frictional deflected engagement with a peripheral surface of the other ring, and a rigid element of sheet material on the said other ring in axially spaced radially overlapping relation with said seal element and coacting with the latter to resist axial separation of the rings.

9. In a tapered roller bearing, and in combination with the cone and cup elements and the tapered rollers of said bearing, a resilient seal mounted on one of said elements at one axial end of the rollers and extending radially with the remote edge portion thereof in frictional engagement with the confronting surface of the other element, the frictionally engaged edge portion of the seal being deflected axially by said engagement toward the rollers, a second resilient seal mounted on the same element at the other axial end of the rollers and having its remote edge portion frictionally engaged with and axially deflected by the confronting surface of the other element, said deflection being outwardly away from the rollers, and means on the said other element coactive with the deflected edge portion of the seal to resist axial separation of the cone and cup elements.

10. A tapered bearing according to claim 9 wherein the separation resisting means is radially extended to form a labyrinth chamber with the seal for impounding of lubricant escaping past the latter.

11. A tapered bearing according to claim 9 wherein the seals are mounted on the cone.

12. A tapered bearing according to claim 11 wherein the seal having the outwardly deflected edge portion is at the larger ends of the rollers.

13. A bearing according to claim 1 including labyrinth sealing means carried by one at least of the rings at the outer side of that one of the seal elements which acts to prevent escape of lubricant from the said annular space between the rings.

14. A bearing according to claim 13 including also labyrinth sealing means carried by one at least of the rings at the outer side of that one of the seal elements which acts to permit escape of lubricant from the said annular space.

References Cited in the file of this patent

UNITED STATES PATENTS

| 945,180 | Ljungstrom | Jan. 4, 1910 |
| 2,000,341 | Larsh | May 7, 1935 |
| 2,140,091 | Murden | Dec. 13, 1938 |
| 2,639,954 | Potter | May 26, 1953 |
| 2,655,392 | Lighthall | Oct. 13, 1953 |
| 2,674,012 | Noelting | Apr. 6, 1954 |
| 2,699,366 | Heinrich | Jan. 11, 1955 |
| 2,750,214 | Bermingham | June 12, 1956 |

FOREIGN PATENTS

| 569,065 | France | Jan. 4, 1924 |
| 871,703 | France | May 7, 1942 |